March 16, 1926.
C. M. OLSON
COW STANCHION
Filed August 24, 1925
1,577,144
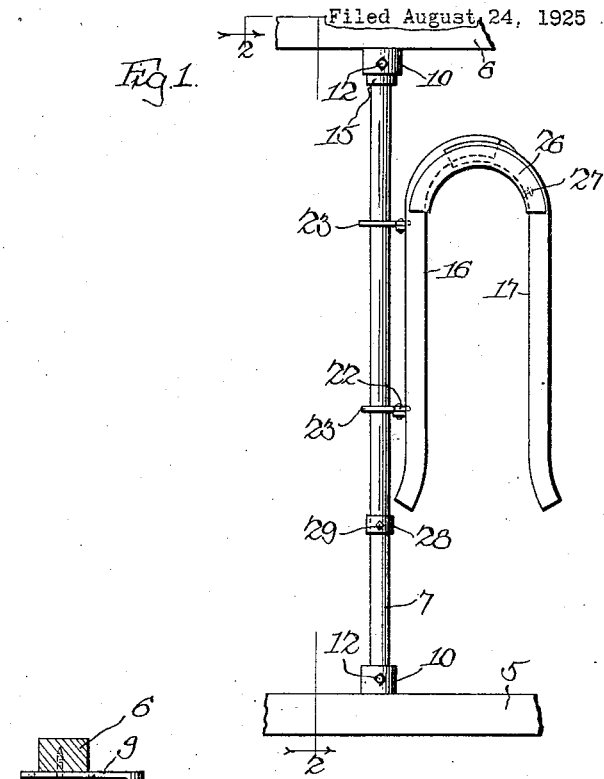
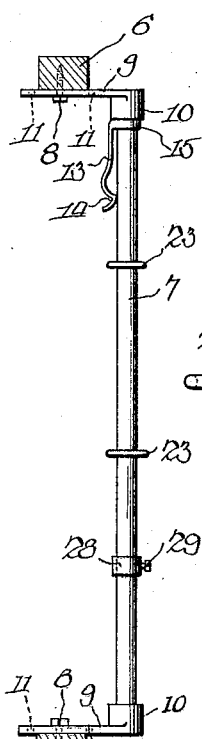
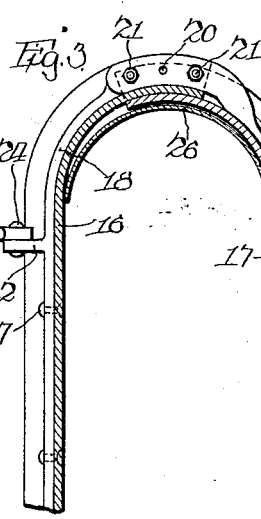
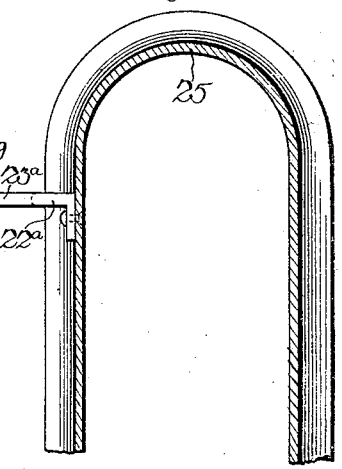
Inventor
Carl M. Olson
By Chas. E. Tillman
Atty.

Patented Mar. 16, 1926.

1,577,144

UNITED STATES PATENT OFFICE.

CARL M. OLSON, OF KILBOURN, WISCONSIN.

COW STANCHION.

Application filed August 24, 1925. Serial No. 52,065.

*To all whom it may concern:*

Be it known that I, CARL M. OLSON, a citizen of the United States, residing at Kilbourn, in the county of Columbia and State of Wisconsin, have invented certain new and useful Improvements in Cow Stanchions, of which the following is a specification.

The objects of this invention are to provide a very simple and inexpensive structure, which will securely, but comfortably hold the animal by the neck, yet will allow of its up and down movement for the convenience of the animal when held in a stall or with its head to its manger, in reaching its food, and in lying down or getting up.

Another object is to construct the animal neck-holding part of the device, so that it can be pivotally, as well as vertically, held by and with respect to its upright support.

A further object is to construct the animal neckholding, or yoke, part of the device that it may be adjusted so as to fit animals with fat or thick necks or thinner and less fat necks.

Still another object of the invention is to provide means for holding the yoke or neck part in a raised and upright position while the animal is free therefrom.

Still another object is to provide means whereby the yoke or neck part and its support can be readily adjusted with respect to the upper and lower supports for the upright support, thus permitting said parts to be forwardly or rearwardly adjusted to suit animals of different sizes or lengths.

Other objects and advantages of the invention will be fully described and more thoroughly understood when read in conjunction with the accompanying drawing, which serves to illustrate embodiments of which the invention is susceptible, it being understood that changes and modifications may be resorted to, so long as they fall within the scope of the appended claims, without a departure from the spirit of the invention.

Referring now to the drawing:—

Fig. 1 is a face view of a stanchion embodying one form of the invention.

Fig. 2 is a side view partly in section taken on line 2—2 of Fig. 1 looking in the direction indicated by the arrows.

Fig. 3 is a vertical sectional view of the upper portion of the yoke or neck part constructed for adjustment as to its size, as shown in Fig. 1, and Fig. 4 is a vertical sectional view of the upper portion of the yoke or neck part, illustrating a modification in its construction.

Like numerals of reference refer to corresponding parts throughout the different views of the drawing.

Referring now more particularly to Figs. 1 to 3 inclusive of the drawing, the reference numeral 5 designates the lower horizontally disposed sill or support and the numeral 6 indicates the upper sill or support for the upright member 7 of the stanchion. These supports or sills 5 and 6 are spaced apart as shown and may be supported in the ordinary or any well known way. The member 5 has secured on its upper surface by means of a pivot 8, a horizontally and forwardly disposed bracket 9, which has at its front end a collar 10 which may be provided with internal screwthreads. This bracket 9 has one or more openings 11 diametrically on each side of the pivot 8, as will be readily understood by reference to Fig. 2 of the drawing. Directly above this bracket, the upper surface of the member 6 is provided with a similar bracket 9 equipped and pivotally held in place in the same way as the lower bracket 10, and just above described, bracket is maintained. Each of the upper and lower collars 10 is provided with a set screw 12, and, as before stated, each of said collars is by preference internally screw-threaded to engage the ends of the upright 7, which ends are by preference externally screwthreaded and of a size to fit within said collars. By this arrangement, it is manifest that the upright 7, after it has the yoke mounted thereon, may be screwed into the collars, or, if it is desired, the screw-threads may be omitted and said upright held in place by the set-screws 12 or otherwise. Just below the upper collar 10, the standard or upright 7 is provided with a depending spring 13, the lower end of which is deflected as at 14 to rest against the said standard and said spring is employed to hold the yoke or rather one of its rings, which co-operate with the standard 7, in its raised or elevated position. For this purpose, the spring 13 is provided at its upper end with a collar 15, which surrounds the standard 7, may be fixed thereto.

By my arrangement of supporting the standard or upright 7, it will be understood that the brackets 9 can be adjusted backward and forward on the members 5, and 6, by means of the screws 8, which are removable to be selectively passed through the holes 11, in the members 5 and 6.

As shown in Figs. 1 and 3 of the drawing, the neck portion or yoke of the device is made of two bent pieces 16 and 17, each preferably made of U-shaped material in cross-section, thus providing lightness, economy, and the inner surface to rest against, or on the sides of the neck of the animal, without injury thereto. As shown, the upper ends of these pieces 16 and 17 overlap one another while their lower ends are slightly diverged from one another to facilitate placing the yoke in position on the animal's neck. Each of these pieces has bolted thereto within the cavity of its U-shape form metal straps 18 and 19 which straps extend upwardly and inwardly and overlap each other laterally, as shown in Fig. 3 of the drawing. Each of these straps is provided with a plurality of spaced openings 20, which coincide with one another and are for the reception of bolts 21, employed for adjustably holding the straps, as well as the pieces 16 and 17 together in order that the yoke may be adjusted to animal necks of various sizes, for it is apparent these bolts can be removed from one pair of openings 20 and inserted in another pair thereof. In this construction of the yoke, one of the straps, the one indicated by the numeral 18, is by preference provided with a pair of vertically spaced lugs 22, which extend laterally from the yoke and each has a ring 23 surrounding the upright 7 pivoted thereto as at 24 to permit more free movement of the yoke or neck part.

In Fig. 4, I have shown a modification in the construction of the yoke, which consists in making it of a single piece of material 25, instead of two pieces as is used in the other construction, which single piece is by preference made of cross-sectional U-shaped material bent to form a loop at its upper end. In this modified construction, a pair of lugs 22ª, one of which only is shown, are bolted directly to the inner part of the U-shaped cavity of one of the sides of the yoke 25, one spaced above the other, and is provided at its outer end with a rigidly fixed ring 23ª for co-operation with the upright 7 of the support.

Again referring to the construction shown in Figs. 1 and 3 of the drawing, it will be understood that as members 16 and 17 overlap each other at their upper ends, an uneven surface will be presented to the upper part of the neck of the animal. To prevent this portion rubbing the animal's neck, and possibly causing it to become sore, a cross-sectional U-shaped shield 26 covering the inner surface of the pieces 16 and 17, as well as their front and rear portions, is employed. This shield 26 may be secured in place by means of one of the bolts 27, which are employed for securing the straps 18 and 19 in place.

To relieve the animal of the weight or pressure of the yoke on the upper part of its neck when it is lying down, the upright 7 is provided on its lower portion with a collar 28, which may be raised on the member 7 to a suitable position for contact with the lower ring, which connects the yoke to the upright 7 of said collar, and which may be fixed at such point, by means of a set-screw 29 seated therein for this purpose. Thus it will be understood that the collar 28 can be adjusted with respect to the said lower ring so as to raise the upper part of the yoke from the animal's neck when it is lying down.

Instead of providing the yoke shown in Figs. 1 and 2 with pivoted rings 23, the rings thereof may be fixed on the yoke, when the construction shown in Fig. 4 is employed, it is obvious that instead of using a fixed ring 23ª, a pivoted ring, as shown in the other construction, may be employed.

Having thus fully described my invention, what I claim as new and desire to secure by Letters Patent is:—

1. In a cow stanchion, the combination with a suitably supported upright, of a yoke having laterally disposed rings co-operating with said upright, said yoke being in the form substantially of an inverted U-shaped figure.

2. In a cow stanchion, the combination with an upright supported at its ends for back and forth adjustment, of an inverted U-shaped yoke having laterally disposed loose connections with said upright.

3. In a cow stanchion, the combination with an upright supported at its ends for back and forth adjustment, of an inverted U-shaped yoke made of two pieces adjustably connected together at the juncture of said pieces and one of said pieces having laterally disposed loose connection with said upright.

4. In a cow stanchion, the combination with an upright supported at its ends for back and forth adjustment, of a depending spring secured to the upper end of said upright and deflected at its lower end towards the same, for engaging one of the connections between the yoke and upright when said yoke is elevated, an inverted U-shaped yoke having laterally disposed connections loosely connected to said yoke and loosely engaging said upright, said yoke being made of two cross-sectional U-shaped pieces adjustably joined together at their upper ends, and a shield mounted so as to cover the lower portion of the juncture of said pieces.

CARL M. OLSON.